INVENTORS
RALPH C. BOYLE
LEONARD PAULUS

INVENTORS
RALPH C. BOYLE
LEONARD PAULIUS
BY
ATT'Y.

INVENTORS
RALPH C. BOYLE
LEONARD PAULIUS
ATT'Y.

United States Patent Office 3,561,277
Patented Feb. 9, 1971

---

3,561,277
MULTISPEED INDEPENDENT POWER TAKEOFF UNIT
Ralph C. Boyle, Hinsdale, and Leonard Paulius, Clarendon Hills, Ill., assignors to International Harvester Company, Chicago, Ill., a corporation of Delaware
Filed Oct. 6, 1969, Ser. No. 864,091
Int. Cl. F16h 37/02, 1/06
U.S. Cl. 74—15.4                     12 Claims

ABSTRACT OF THE DISCLOSURE

A change speed power drive mechanism having a housing, an input member extending into the housing, and an output member extending out of the housing and including a movable means carried by said housing and journaling one of said members such that in a first position said output member is coaxially aligned with the input member and in another position said output member is driven by said input member, with adaptor means being provided to take power directly from said input member when said output member is in coaxial alignment with said input member or to take power from said output member when such is in said second position.

BACKGROUND OF THE INVENTION

This invention relates to a change speed mechanism in which either of two output speeds may be obtained from a single input member. More specifically, as disclosed in the preferred embodiment, the instant invention relates to a two-speed power takeoff drive (PTO) for a farm tractor although it will find other applications.

DESCRIPTION OF THE PRIOR ART

The utilization of a power shaft driven by the engine of a farm tractor for the purpose of delivering power to associated implements is quite well known in both the United States and foreign countries. The acceptance of such drive mechanisms has been followed by the acceptance of national standards as to speed and dimensions within the farm equipment industry although differences may be found between such national standards. For example, within the United States, the industry has adopted as standard a six-spline adaptor shaft rotating at a speed of 540 r.p.m. to deliver power to auxiliary equipment as well as a second standard requiring the use of a twenty-one splined adaptor shaft rotating at 1000 r.p.m., the 540 r.p.m. speed being originaly adopted with the new standard of 1000 r.p.m. being subsequently adopted. Thus, in order for a farm tractor to be able to utilize PTO driven implements designed to be operated at 540 r.p.m. as well as PTO driven implements which are to be powered at 1000 r.p.m., it becomes necessary to provide a mechanism for a tractor in which either speed may be easily obtained. Similarly, in many foreign countries a standard has been accepted which requires that the PTO driven implements be driven at speeds of 590 r.p.m. and 1000 r.p.m. Thus, in the design of farm tractors today it is imperative that a provision be made for a combination of any two of these three speeds.

The prior art itself discloses many and varied devices for providing at least two speeds for the PTO shaft. Examples of such prior art would include U.S. Pat. No. 3,001,049 issued to Von Fumetti and U.S. Pat. No. 3,002,393 issued to Browning, as well as U.S. Pat. No. 3,352,165 issued to Lee. Although acceptable, such designs may result in excessive manufacturing cost requiring an excessive amount of space within the tractor frame, or incorporate a more complex clutch arrangement than is desirable in order to obtain two output speeds.

SUMMARY OF THE INVENTION

Accordingly, the instant invention relates to a novel and unique change speed mechanism particularly adapted for utilization as a power takeoff drive mechanism in a farm tractor. The proposed combination takes the form of a housing into which is journaled a first input member, and a second output member, the second member being supported by a carriage-like structure which is itself carried by the housing. A bore then extends through the second member whereby in one position of the carriage member, an adaptor power shaft may extend through the bore of said second member so as to be driven by the input member, while in another position, the output shaft effects a gear reduction so as to drive the adapter shaft at a lower speed. Provision is made for easily substituting the input shaft whereby a different gear reduction is effected so as to comply with any national standard.

Accordingly, it is an object of this invention to provide a simplified design in which a PTO drive assembly facilitates obtaining two different speeds therefrom. It is another object of the instant invention to provide a simplified design in which an output shaft is alternated between two positions by a simple eccentric means to provide either of two output speeds. It is a further object of the instant invention to provide a compact PTO drive mechanism having a single output shaft capable of two speeds as opposed to the present standard requiring two output shafts laterally displaced from one another. Finally, it is an object of the instant invention to provide a drive mechanism which is easily adapted to provide different variations and combinations of speeds for utilization with PTO driven implements. The manner in which these and other objects of the instant invention may be obtained will be made clear by consideration of the following specification and claims when taken in conjunction with the accompanying drawings, in which:

DETAILED DESCRIPTION

Figure 1:
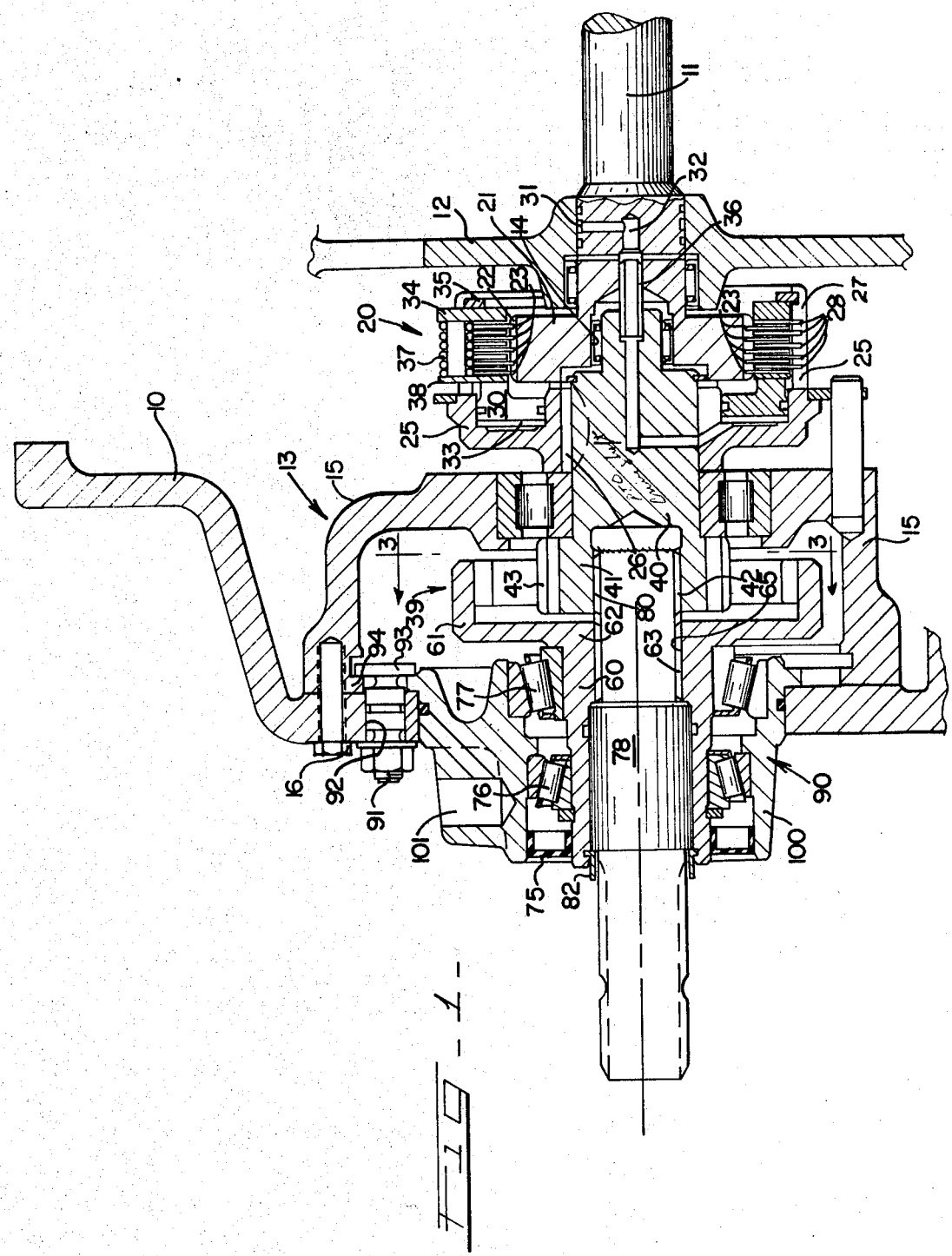
FIG. 1 is a side elevational view taken in section along the center line of the change speed mechanism and disclosing said mechanism in a direct drive position.

As exemplified in the attached drawings, the preferred embodiment of our unique invention is incorporated into the rear frame 10 of a tractor (not shown), the frame enclosing and supporting the components of the instant invention. The primary components of sub-assemblies of a conventional PTO drive include countershaft 11 journaled within web section 12 of frame 10 as indicated so as to be driven by the engine in the vehicle at a normal operating speed of 1000 r.p.m. to deliver power to the change speed mechanism hereinafter described. A hydraulic clutch 20 is interposed between the countershaft 11 and a housing 13 which carries the instant invention and is operative to deliver power to said mechanism. Obviously the housing 13 may be part of the frame or designed as an assembly to be attached to the tractor frame. Receiving power from the change speed assembly is adaptor shaft 78 (see FIG. 1) when direct drive is taken from the mechanism, or an adaptor shaft 79 (see FIG. 2) when the mechanism effects drive reduction.

With more specific reference to the instant invention and the assembly as disclosed, the hydraulic clutch 20 is interposed between the countershaft 11 and the PTO mechanism for selectively delivering power to the latter.

The clutch assembly includes a radial driving drum 21 which is integral with the countershaft 11 so as to be driven thereby and external splines 22 on drum 21 are effective to constrain friction clutch disks 23 for rotation therewith. Journaled within a counterbore 14 of countershaft 11 by appropriate bearings is a first member, herein referred to as the PTO drive shaft 40 for receiving power from the clutch 20 through a driven drum 25 mounted thereon and constrained for rotation therewith by a key 26. Internal splines or slots 27 on the driven drum 25 are provided for receiving power from friction clutch disks 28 when fluid energy is delivered to an annular groove 31 and bore 32 to an expansionable chamber 33 which is effective to create an axial force compressing the friction clutch disks 23 and 28 together between piston backing plate 38 and abutment 34 held in place by snap ring 35. As disclosed, the bore 32 may comprise elongated chambers drilled in the countershaft 11 and the PTO drive shaft 40 with an insert 36 joining these chambers and completing the conduit. Thus, when fluid is delivered to chamber 33 through the bore 32 to act against a piston 30 upon actuation of a valve (not shown), power will be transmitted from the countershaft 11 through the radial driving drum 21 the friction clutch disks 23 and 28 and the radial driven drum 25 so as to transmit power to the PTO input shaft 40. When such fluid energy is exhausted from the expansible chamber 33 springs 37 acting against the piston 30 through a plate 38 will be effective to release the clutch and interrupt power transmission.

With more specific reference to the instant invention, the housing 13 includes web section 15 joined to frame 10 by bolts 16 or other conventional means. Within the web section 15 is an annular cage member 90 whose center is eccentric with respect to countershaft 11 as well as PTO drive shaft 40, and as disclosed in FIG. 1 its center lies above the common axis of the aforesaid shafts.

This carriage member 90 rotatably journals an output shaft 60 or second member having a bore 65 therethrough, appropriate bearings 76 and 77 and seal 75 being provided as indicated so as to preclude loss of oil from the tractor frame reservoir or to preclude ingress of dirt and other foreign materials into the reservoir. As noted in FIG. 1, the output shaft 60 is also eccentric to carriage member 90, the degree of eccentricity being such as to initially permit axial alignment of bore 65 with drive shaft 40.

A spur gear pinion 41 is then provided integrally with shaft 40 having external teeth 43 and internal splines 42 are formed in a counterbore as shown. These splines 42 are adapted for receiving the splines 80 of adaptor shaft 78 so as to provide direct drive from countershaft 11, through the clutch assembly 20, the spur gear pinion 41, and bore 65, an implement drive shaft being connectable to the rearwardly extending portion adaptor shaft 78.

To provide a lower speed for PTO driven implements requiring same, the PTO output shaft 60 additionally includes a gear 61 formed integrally with hub 62, the internal teeth of the ring gear 61 being adapted for meshing with the external teeth 43 of a spur gear pinion 41 to form a power coupling. Engagement of this reduction gear transmission is effectuated and made possible by the eccentricities referred to above.

With reference to FIGS. 2–5, it will be observed that if the carriage 90 is rotated 180°, the ring gear 61 will be moved upwardly so as to mesh with spur gear pinion 41 and speed reduction is effectuated since the PTO output shaft 60 is driven at a reduced speed. Internal splines 63 now mesh with external splines 81 of adaptor shaft 79 for delivery of power to the implement. Thus, a hollow output shaft 60 when eccentrically carried by rotatable cage 90 provides a two-speed output, if in a first position, the output shaft is aligned with the input member and in a second position is driven by the input member.

It should be noted that two different adaptor shafts are provided for transmitting power to the implement since national standards within the U.S. require that the 540 r.p.m. shaft be provided with six splines, while the 1000 r.p.m. shaft is provided with twenty-one splines. Additionally it should be noted that the interior ends of the adaptor shafts are different in that for direct drive, the adaptor shaft 78 is longer and its splines 80 are long enough to engage only the internal splines 42 of spur gear pinion 41 while adaptor shaft 79 is shorter so as to preclude any engagement with spur gear pinion 42. Abutting surfaces between the adaptor shafts 78 and 79 and the PTO output shaft 60 may appropriately limit insertion of the adaptor shafts into the housing 13 while a snap ring 82 precludes axial outward movement of either shaft once engaged.

For locking the carriage member 90 in a fixed position, bolts 91 extend through apertures 92 whereby the heads 93 engage a boss 94 on said carriage member 90, and tightening of said bolts will be effective to lock the carriage member in a given angular position. Suitable seals are provided about said bolts, the annulus of the carriage 90, as well as within the PTO shaft 60 as indicated.

Figure 2:
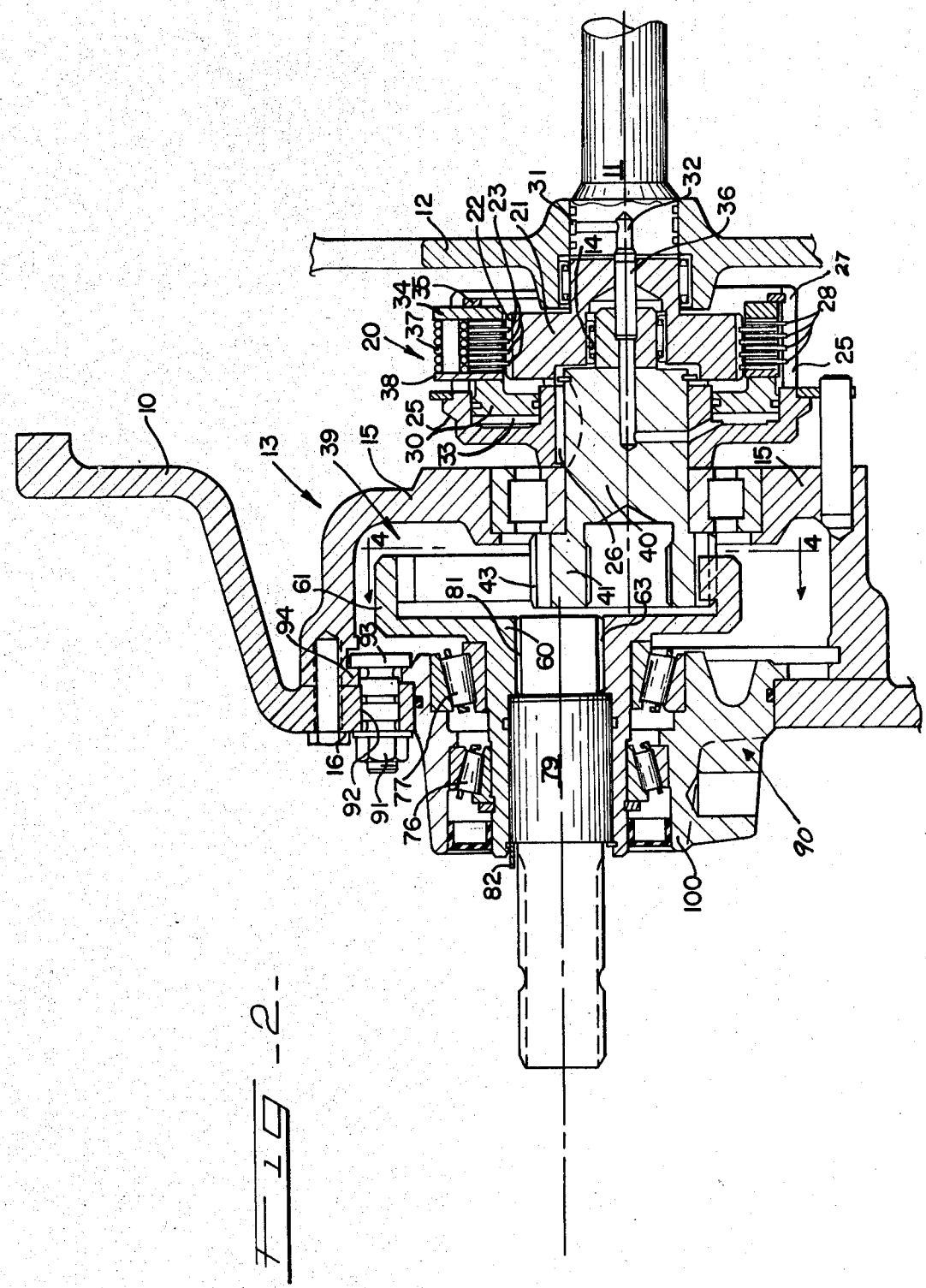
FIG. 2 is a similar view disclosing the mechanism in a gear reduction position.
Figure 3:
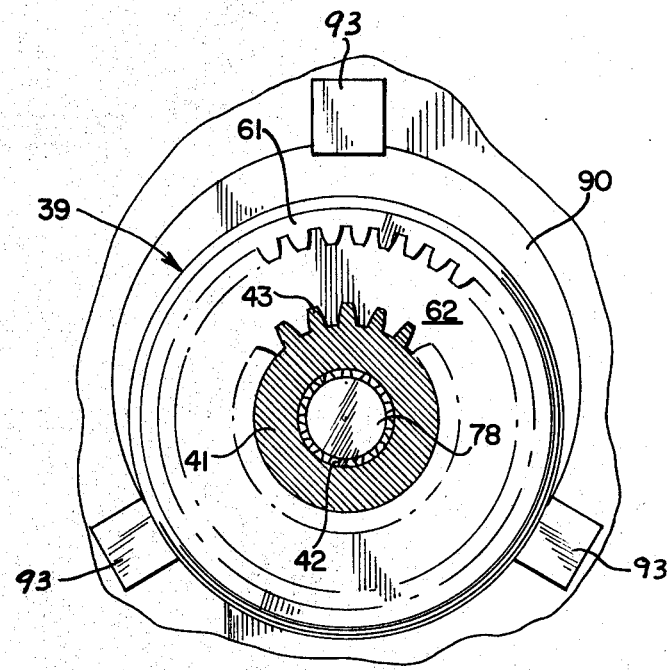
FIG. 3 is a rear elevational view taken along the line 3—3 of FIG. 1.
Figure 4:
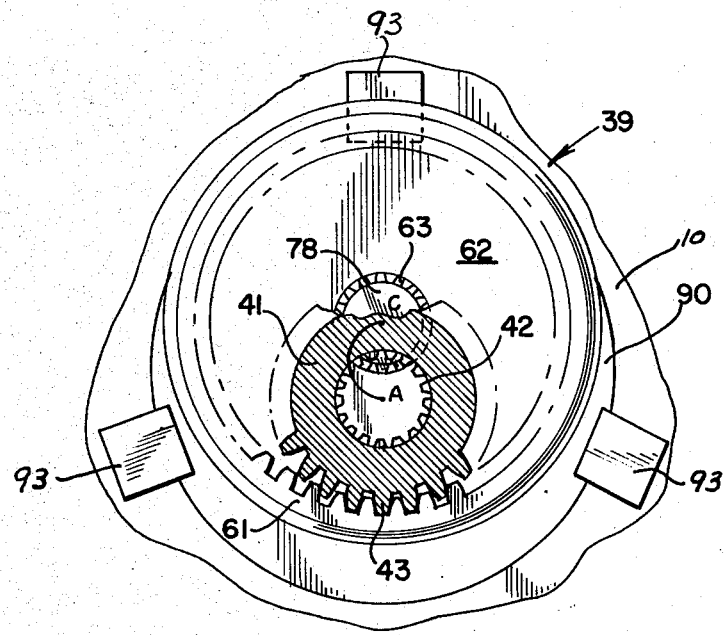
FIG. 4 is a similar view taken along the line 4—4 of FIG. 2.
Figure 5:
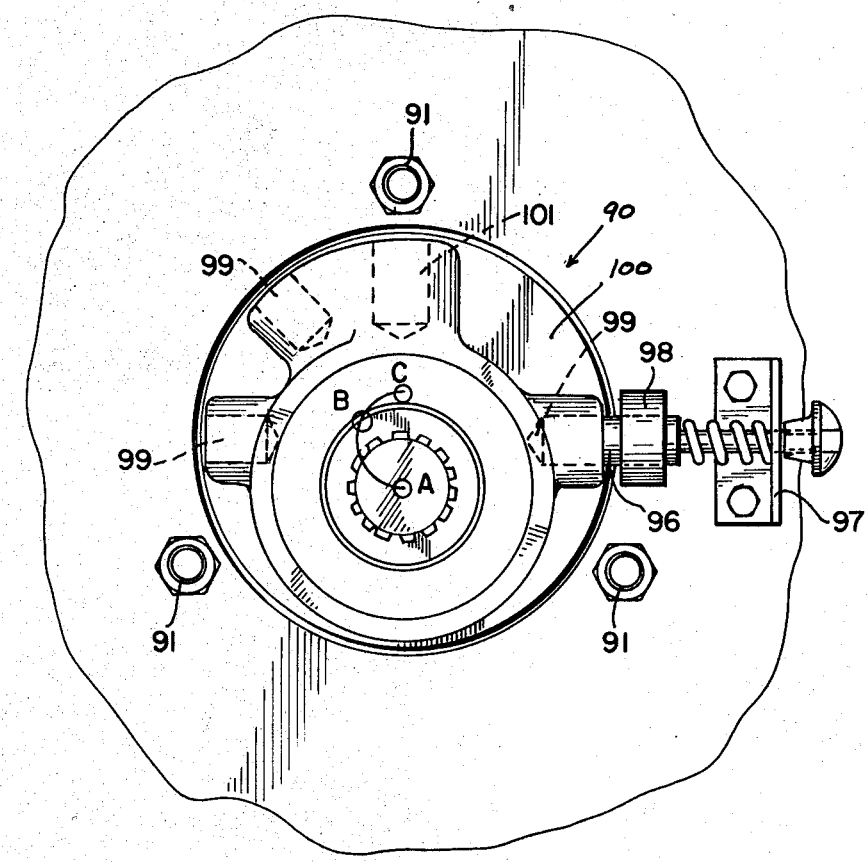
FIG. 5 is a rear elevational view of the mechanism.

As previously mentioned, direct drive is provided directly from the spur gear pinion 41 when the PTO shaft 60 and the carriage member 90 are in the position disclosed in FIGS. 1 and 3 such that adaptor shaft 78 may extend directly therethrough. Such effectuates a gear ratio of 1:1 and 1000 r.p.m. output speed is obtained. However, in order to obtain an output speed of 540 r.p.m., a gear reduction of 18:34 is necessary and consequently the spur gear pinion 41 is provided with eighteen teeth while the ring gear 61 of the PTO output shaft 60 is provided with 34 teeth. In order to facilitate this gear reduction, the three bolts 91 are first loosened, and as disclosed in FIG. 4, the carriage member 90 is rotated 180° to effectuate engagement of the spur gear pinion 41 with the internal ring gear 61. The center line of output shaft 60 will then be caused to move from a position indicated at A to a position indicated at C. In order to provide for another gear reduction, it is only necessary to change spur gear pinion 41 or internal gear 61. For example, if the manufacturer desires to comply with European standards of 590 r.p.m., a 20:34 gear reduction is necessary and the pinion should be provided with 20 teeth. The operation of the device will be identical to that previously described, but since the pitch diameter of the pinion having 20 teeth will have a larger dimension, engagement with the internal ring gear 61 having 34 teeth will be effectuated upon a lesser rotation of carriage member 90 and in order to convert such a change speed transmission from direct drive to one having a 20:34 gear reduction, the bolts 91 need only be loosened, and the carriage 90 be rotated such that the centerline of the PTO output shaft be located at the approximate point B, and then locked in place.

In order to facilitate conversion of the mechanism from one speed to another, accurate index means may include a dowel pin 96 which is spring biased between a bracket 97 and an apertured guide 98 for meshing with indexing apertures 99 on the rearward extending boss 100 of the carriage 90. Such apertured index marks might be appropriately provided to denote gear reductions of 1:1, 20:34, and 18:34 so as to indicate proper positioning of the carriage 90 with respect to the spur gear pinion selected although the direct drive index will be the same in either case. Finally, a further aperture 101 is included for reception of a tool (not shown) to aid in rotation of the carriage member 90 so as to facilitate selection of the desired gear ratio.

In summary, it should be clear that applicants have provided a unique and novel, inexpensive and simplified form of a power takeoff assembly for a farm tractor as well as a change speed transmission adaptable and applicable to other uses. With respect to the desired gear ratios defined by the standards both here and abroad, a favorable advantage is achieved in that the displacement of the PTO adapter shaft is minimal even though a large gear reduction is effectuated upon rotation of the carriage. Such minimizes design considerations in rotating the carriage unit as well as avoiding complications with the hitch structure of current tractors. Similarly, a hitherto compactness of the PTO mechanism is obtained through the instant disclosure as well as simplicity in design concepts. Finally, by the simple substitution of a spur gear pinion, our PTO mechanism is readily adaptable for compliance with standards in various countries. It should be further appreciated that the various components may easily be reversed for greater accessibility.

We claim:
1. An improved PTO drive for a tractor comprising:
    (1) a movable cage carried by the housing of said tractor,
    (2) a PTO drive shaft within the housing and extending toward said movable cage, said drive shaft having internal and external driving surfaces, and
    (3) means eccentrically carried by said cage and having a bore therein and driven surface thereon for permitting power transmission directly from said input power shaft through said bore at one speed when said cage is in one position and power transmission at a second speed from said means when said cage is in a second position.
2. An apparatus as recited in claim 1 in which said driving surface of said PTO drive shaft is provided with external gear teeth and internal splines and said means comprises a hub having a radial flange thereon with internal gear teeth as its driven surface and said bore of said hub being provided with splines, the internal gear teeth of said flange meshing with the external gear teeth of said input shaft when said cage is in said second position.
3. An apparatus as defined in claim 2 in which said cage is annular so as to provide said alternate speeds upon rotation of said cage.
4. An apparatus as defined in claim 3 in which:
    (1) indexing means are provided on said tractor housing and said cage for indicating the proper position of said rotatable cage to insure the same is positioned for either one speed or the other.
5. A multispeed transmission mechanism comprising:
    (1) a housing,
    (2) an input shaft extending into said housing and having internal and external driving surfaces,
    (3) cage means apertured within said housing and movable to at least two positions,
    (4) driven means eccentrically carried by said cage for permitting power to be taken directly from said input shaft in one position of said cage, and for receiving and transferring power when said cage is in a second position.
6. An apparatus as defined in claim 5 in which:
    (1) said cage means is annular.
7. An apparatus as defined in claim 6 in which the eccentricity of said output means is provided by:
    (1) the center of said annular cage means being offset from the longitudinal axis of the input shaft, and
    (2) said driven means are journaled in said cage at a distance from the center of said cage equal to said offset.
8. An apparatus as recited in claim 7 in which indexing means are provided on said tractor housing and said cage means for indicating the proper position of said rotatable cage to insure that same is positioned for either one power output or the other.
9. A convertible power drive mechanism comprising:
    (1) a housing,
    (2) first and second members respectively extending into and out of said housing,
    (3) movable means interposed between said second member and said housing for eccentrically journaling said second member with respect to said movable means for positioning said second member in coaxial alignment with said first member in one position of said movable means whereby power may be taken directly from said first member.
10. An apparatus as recited in claim 9 in which:
    (1) said first and second members are provided with power coupling means, and
    (2) a power coupling is effected upon movement of said movable means to a second position whereby power may be taken from said second member at a higher torque output.
11. An apparatus as recited in claim 10 in which adaptor drive means are provided for receiving power from said first member or said second member.
12. An apparatus as recited in claim 10 in which:
    (1) indexing means are provided for insuring that said cage means is in one position or the other.

References Cited
UNITED STATES PATENTS

| | | | |
|---|---|---|---|
| 3,059,505 | 10/1962 | Reicks | 74—11X |
| 3,279,275 | 10/1966 | Christie | 74—15.4X |
| 3,507,372 | 4/1970 | Gilbertson et al. | 74—15.4X |

LEONARD H. GERIN, Primary Examiner

U.S. Cl. X.R.
74—413